UNITED STATES PATENT OFFICE.

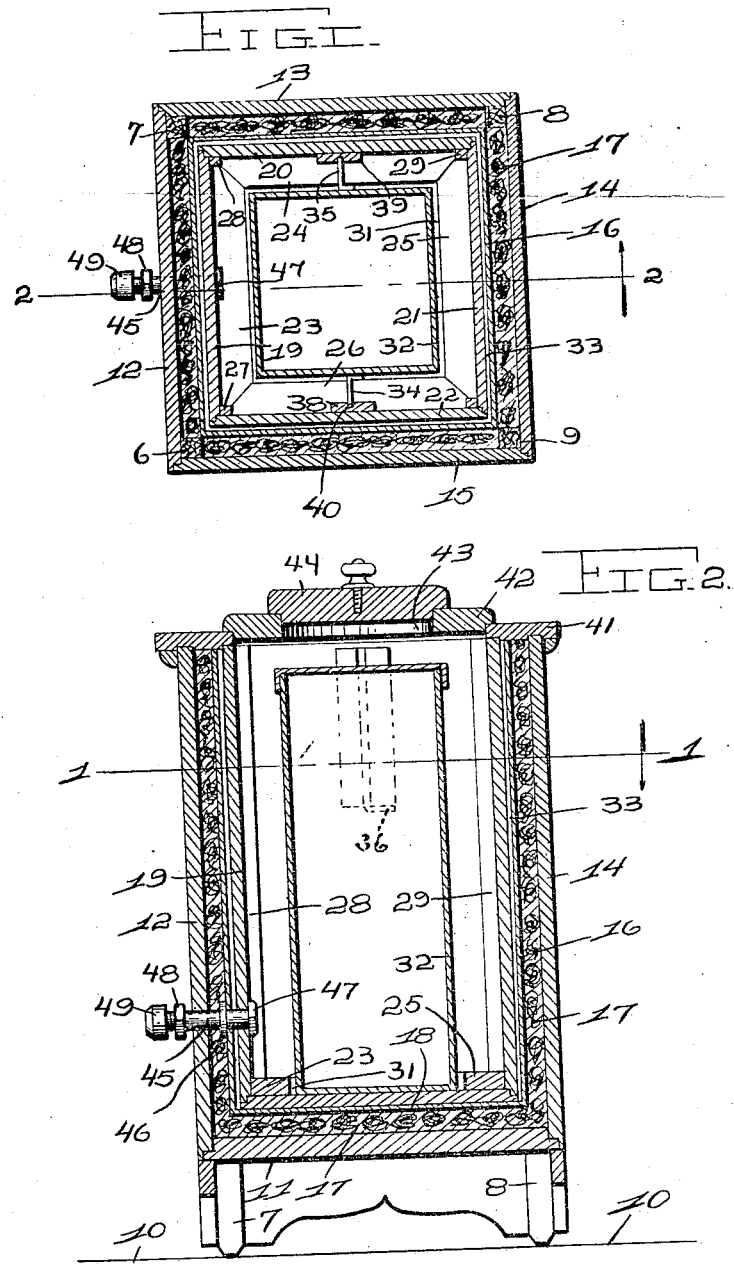

CHARLES NELSON, OF ST. LOUIS, MISSOURI.

ICE-CREAM CABINET.

No. 819,789.      Specification of Letters Patent.      Patented May 8, 1906.

Application filed January 6, 1905. Serial No. 239,887.

To all whom it may concern:

Be it known that I, CHARLES NELSON, a citizen of the United States, and a resident of St. Louis, Missouri, have invented certain new and useful Improvements in Ice-Cream Cabinets, of which the following is a specification containing a full, clear, and exact description, reference being had to the accompanying drawings, forming a part hereof.

My invention relates to improvements in ice-cream cabinets; and it consists of the novel features herein shown, described, and claimed.

In the drawings, Figure 1 is a horizontal section on the line 1 1 of Fig. 2 looking downwardly as indicated by the arrow. Fig. 2 is a vertical section on the line 2 2 of Fig. 1 and looking in the direction indicated by the arrow.

Referring to the drawings in detail, the posts 6, 7, 8, and 9 are mounted in vertical positions and are long enough to extend from the floor-line 10 to the top of the cabinet. The bottom 11 is secured to the posts a short distance above the floor and parallel therewith. The sides 12, 13, 14, and 15 are secured to the outer faces of the posts and extend from the bottom 11 to the upper ends of the posts, said bottom and sides being lapped to form tight joints. A galvanized-iron lining 16 is inserted downwardly between the posts 6, 7, 8, and 9, and the space under and around the lining is filled with cork 17 or other suitable non-conducting material. A wooden lining is placed in the galvanized-iron lining, said wooden lining comprising the bottom 18, the sides 19, 20, 21, and 22, the reinforcements 23, 24, 25, and 26, mitered together and placed upon the bottom 18, and the corner-pieces 27, 28, 29, and 30. The bottom and sides are lapped to form close water-tight joints, the reinforcements are arranged in the form of a square to produce the central opening 31 to receive the lower end of the ice-cream receptacle 32, and the corner-pieces are placed inside of the sides at the corners to strengthen the corners and to assist in guarding against leaking. The wooden lining thus constructed is placed inside of the sheet-metal lining and the space between the two linings is filled with paraffin-wax 33.

Heretofore it has been the practice to place the sheet-metal lining upon the inside, and when the ice is rammed around the ice-cream receptacle the sheet-metal lining is frequently bruised and punctured and caused to leak. I therefore prefer to place a strong reinforced wooden lining inside of the sheet-metal lining, the reinforcement serving to receive the blows without injuring the parts or causing leakage.

Wings 34 and 35 extend outwardly from the upper end of the ice-cream receptacle, and tongues 36 extend downwardly from the wings. Retaining-strips 38 and 39 are attached to the inner faces of the sides 20 and 22 at their transverse centers and upper ends, said strips having slots 40 to receive the wings 34 and 35, and the receptacle is inserted downwardly into the box with the wings 34 and 35 in the slots 40, and then the tongues 36 are bent to horizontal positions against the lower ends of the retaining-strips, so as to hold the ice-cream receptacle from floating. A cover 41 is built upon the ice-box to cover the space between the outer walls and the inner lining. A cover 42 is removably applied to the cover 41 and has a center opening 43 to provide access to the ice-cream receptacle, and this is removably closed by a third cover 44.

In constructing the ice-box an outlet is provided comprising the pipe 45, extending from the ice-chamber through all the walls, the flange 46 upon the pipe against the outer face of the galvanized iron, preferably soldered in position, the nut 47 upon the inner end of the pipe against the inner face of the wall of the wooden lining, the nut 48 upon the pipe outside of the ice-box, and the cap 49 upon the outer end of the pipe. When the cap 49 is removed, the water from the ice-box will run through the pipe 45, and the nut 48 is to prevent the water from running backwardly on the pipe and down upon the outer face of the wall.

I claim—

In an ice-cream cabinet, a rectangular receptacle, retaining-strips arranged on the interior of the opposite sides of said receptacle adjacent the upper end thereof, in the faces of which strips are formed vertical slots, a receptacle removably positioned in the first mentioned receptacle, wings carried by said last-mentioned receptacle and adapted to enter the vertical slots, and tongues formed integral with the lower ends of the wings, and which tongues normally extend beneath the retaining-strips, substantially as specified.

In testimony whereof I have signed my name to this specification in presence of two subscribing witnesses.

CHARLES NELSON.

Witnesses:
 ALFRED A. EICKS,
 M. D. SCHULZE.